Figure 1:
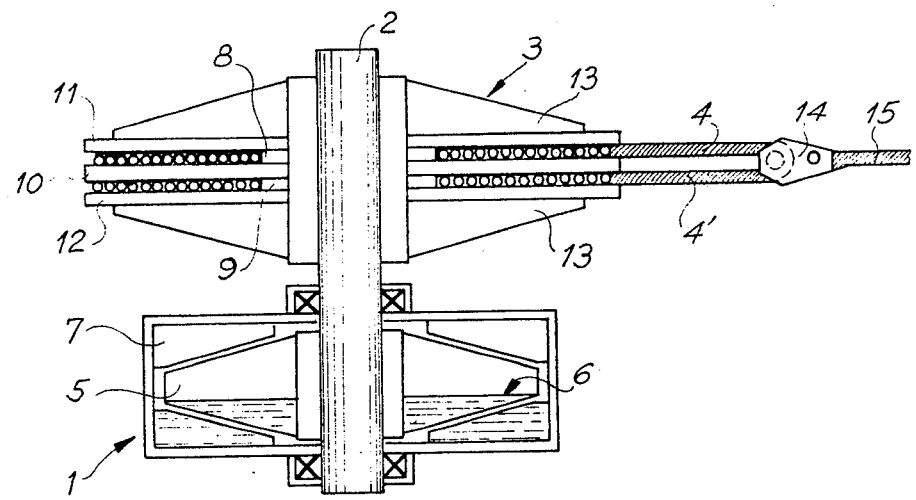

United States Patent [19]
Bernard

[11] 3,877,660
[45] Apr. 15, 1975

[54] DEVICE FOR BRAKING MOBILE OBJECTS

[75] Inventor: Jean-Paul G. Bernard, Paris, France

[73] Assignee: Aerazur Constructions Aeronautiques (Societe Anonyme), Moulineaux, France

[22] Filed: June 25, 1973

[21] Appl. No.: 373,337

[30] Foreign Application Priority Data
June 26, 1972 France .............................. 72.23037

[52] U.S. Cl. .............. 242/156; 242/54 R; 242/117; 242/156.2; 244/110 A; 254/183
[51] Int. Cl. .......................... B65h 59/04; B64f 1/00
[58] Field of Search ....... 242/156, 156.2, 54 R, 117; 188/290; 244/110 A; 254/183, 188, 184

[56] References Cited
UNITED STATES PATENTS

| | | | |
|---|---|---|---|
| 452,215 | 5/1891 | Cornelius ........................ | 254/184 X |
| 721,616 | 2/1903 | Sneer ............................... | 242/117 X |
| 989,098 | 4/1911 | Wolf et al. .................... | 242/117 UX |
| 1,182,679 | 5/1916 | Hatton ........................... | 242/156.2 |
| 1,259,445 | 3/1918 | Rees ................................. | 254/183 |
| 2,189,447 | 2/1940 | Martin .......................... | 254/188 UX |
| 2,952,336 | 9/1960 | Cushman .................. | 244/110 A UX |
| 3,081,957 | 3/1963 | Vandebilt .................... | 242/156.2 X |
| 3,140,761 | 7/1964 | Doolittle ..................... | 244/110 A X |
| 3,604,665 | 9/1971 | Jamison .......................... | 244/110 A |
| 3,688,999 | 9/1972 | Plattner et al. .............. | 242/156.2 X |

*Primary Examiner*—Stanley N. Gilreath
*Attorney, Agent, or Firm*—Sughrue, Rothwell, Mion, Zinn & Macpeak

[57] ABSTRACT

A device for braking mobile objects is disclosed wherein the ends of cable engaging the mobile object are connected to an energy absorption device via a drum. The drum is affixed to the shaft of a rotatable hydro kinetic torque converter which serves to absorb the energy generated by braking the mobile object. The cable is spirally wound on the drum and engages means to overcome the inertia of the drum and initiate rotatable movement. In one embodiment, the ends of the cable are each attached to two cables which engage the drum.

4 Claims, 2 Drawing Figures

DEVICE FOR BRAKING MOBILE OBJECTS

This invention relates to a device for braking mobile objects.

Devices for braking mobile objects are known which comprise an energy-absorbing device connected to one or more fixed points by means of a flexible connection, the device being designed so as to be used in braking for example an aircraft which engages a cable or protective netting at the end of a track or runway. Use is made at the fixed points of means for retaining the flexible connection, which means is in the form of a winch for braking the winding of the connection when the latter is subjected to tension as a result of the engagement of the cable or the netting.

Previously this flexible connection, which was usually a textile belt, was wound on a drum fixed on the shaft of a rotor of a conventional hydro-kinetic torque converter functioning as a brake, for example a paddle wheel constituting the rotor and rotating in a liquid, the paddle wheel being arranged opposite another fixed paddle wheel constituting a stator which is integral with the framework of the apparatus. This arrangement of drum and torque converter has the advantage that when the flexible connection means or textile belt is unrolled from the drum under the tension brought about by the constraint of a mobile object which is to be braked, the rotation of the drum is braked by the torque converter and thus the speed at which the flexible connection unrolls is progressively reduced at the same time as the winding diameter of the latter decreases as a result of the advance of the mobile object. An essentially constant braking force is thus obtained which is proportional to the square of the initial speed of the mobile object.

This arrangement offers a number of advantages, but on the other hand the use of textile web suffers from the disadvantages that the textile web is expensive, bulky, and subject to ageing and tearing. It has therefore been suggested that the textile web be replaced by a flexible connection in the form of a conventional metallic or textile cable, but various difficulties have arisen in adapting such a cable. It was in fact necessary, inter alia, to find a means which would make it possible to obtain sufficient variation in the winding diameter of the cable while at the same time generating a drum rotation speed which was compatible with the regulating of the desired braking.

The invention consists in a device for braking a mobile object comprising an energy-absorbing device connected to at least one fixed point by means of a flexible connection comprising a metallic or textile cable, a hydro-kinetic torque converter acting as a brake and having fixed on its rotor shaft at least one drum which takes up the cable winding in the form of a coil which has a single thickness of at least one cable. The drum(s) makes it possible to coil the cable onto a single thickness corresponding to the diameter of the cable. This coiling of the cable makes it possible to obtain a variation in the winding radius of the cable, because each winding results in the radius increasing the diameter of the cable.

However, in certain arrangements the final winding radius is prohibitive and incompatible with the desired control of braking, while generating a drum rotation speed at the start of unwinding which was too low, and this therefore applied to the torque converter rotor. To overcome this difficulty the cable may be replaced by two cables of a smaller diameter but supplying to both the same resistance and wound onto coupled coiling drums, so that the final radius of each cable is greatly reduced relative to that of a single cable. Furthermore, since the diameter of these two cables is not strictly constant, their winding diameters may vary with respect of each other, and in order to compensate for these variations the two cables may be linked to a system which allows one cable to slide with respect of the other to establish equilibrium or the cables may be joined in a single cable rigged on a pulley block. The system or the block mentioned above are respectively fastened to a cable providing a link with the mobile object. Variations in the winding diameters of the cables may be due to differences in their actual diameters.

The solitary cable may be replaced by several pairs of cables wound onto a corresponding number of coupled coiling drums, the two cables of each pair being connected to a system providing equilirium or to a pulley, the pairs of cables themselves being provided with similar means establishing equilirium between themselves.

The cheeks of the drums are preferably so designed that they have a great rigidity so that they do not allow the riding up of two windings in each coil, which results in drums having a great inertia and which are difficult to set in rotation simply by means of the tension in the cables. To overcome this difficulty in initiating rotation each drum is suitably provided with a mobile radial arm which is greater than the radius of each cheek. Each of the cables passes onto the free end of the radial arm when leaving its final winding, this mobile arm being designed to augment the lever arm of the torque setting the rotor in motion.

Figure 2:
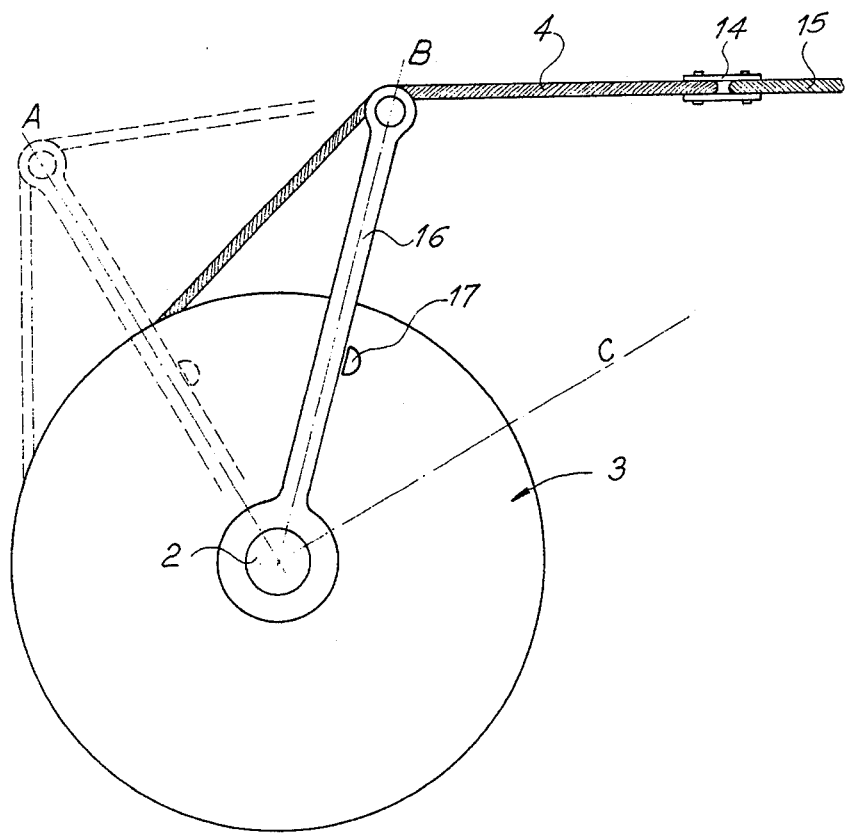

The invention will be further described by way of example only, with reference to the accompanying drawings, in which:

FIG. 1 is a diagrammatic side view of a device for braking a mobile object, provided with a coupled coil drum; and FIG. 2 is a plan view of the drum only showing the mobile arm which aids the setting in rotation of the drum under the tension of the cable or cables.

The device shown in the drawings for braking a mobile object comprises a hydro-kinetic torque converter 1 which has fixed on its rotor shaft 2 a coupled coil drum 3 with two cables 4, 4'.

The torque converter 1, which acts as a brake, comprises a rotor in the form of a paddle wheel 5 which may be rotated in a liquid (the level of which is indicated by reference numeral (6), and a stator in the form of a fixed paddle wheel 7 integral with the chassis (not shown) of the device.

The coupled coil drum 3 which is fixed on the shaft 2 comprises two flat winding discs 8, 9 separated by a central cheek 10 and enclosed by two outer cheeks 11, 12. Each flat winding disc 8, 9 has a thickness equal to the diameter of each cable 4, 4' which is to be coiled thereupon in a single thickness. The outer cheeks 11, 12 have a rigid construction and as a result of being provided with reinforcing fins 13 so that they may not move away from the central cheek 10 and thus prevent the riding up of two cable windings.

The two cables 4, 4' are combined into a single cable rigged on a pulley block 14, which allows equilibrium to be established between the cables in the course of their unwinding if their diameter is not constant. The pulley block 14 is connected to means 15 for connecting the mobile object to be braked.

As shown in FIG. 2, the drum 3 is also provided with a mobile radial arm 16 on the free end of which the cables 4, 4' pass. The arm 16 is worked so as to provide a consistent lever arm facilitating the setting in rotation of the drum and therefore of the rotor under the tension of the cables. The initial position of the arm is indicated by reference letter A (broken line), the position of the arm in the course of its setting in rotation of the drum is indicated by reference letter B, and the final position of the arm is indicated by reference letter C. The arm 16 acts on the drum by means of a stop member 17 which is effaced after one quarter revolution of the latter.

Such a stop is known per se and can for example comprise a spring biased stop element extending perpendicular from one of the outer cheeks of the drum and which is engaged on a first face or surface thereof by arm 16 to initiate rotation of the drum. The stop element is retracted or urged into a recess or hole in said one outer cheek upon the arm 16 engaging a second or opposite face of the stop element when the drum is rotating relative to the arm to further unwind cables 4 and 4' from the drum.

What we claim is:

1. In apparatus for braking an aircraft of the type wherein an arresting cable is disposed so as to be engaged by a hook apparatus attached to said aircraft, said cable having rotary, fluid energy absorbing means, attached to each end wherein said energy absorbing means has an input shaft, the improvements comprising:
   a. a drum attached to said input shaft at its center,
   b. means to attach said arresting cable to said drum,
   c. means attached to said drum and engaging said attaching means to initiate rotation of said drum when tension is applied to said arresting cable, and
   d. a plurality of spaced apart discs attached to said drum and extending radially beyond the periphery of said drum to define an annular space, the width of such space being equal to the width of the cable attachement means so as to cause said attachment means to be spirally wound on said drum.

2. The improved aircraft braking device of claim 1 wherein said means to attach said arresting cable to said drum comprises a second cable having both ends attached to said drum and its approximate mid point pivotally attached to said cable means.

3. The improved aircraft braking device of claim 2 wherein said plurality of discs affixed to said drum, are spaced apart a distance equal to the diameter of said second cable, so as to cause said second cable to be spirally wound on said drum.

4. The improved aircraft braking device of claim 1 wherein said means to attach said cable means to said drum comprises a second and third cable each having a first end attached to said drum, the second ends attached to each other and pivotally attached to said cable means.

* * * * *